United States Patent [19]

Newton

[11] Patent Number: 5,273,093
[45] Date of Patent: Dec. 28, 1993

[54] RACING TIRE ASSEMBLY

[75] Inventor: Robert L. Newton, Lakeville, Ind.

[73] Assignee: Hoosier Racing Tire Corp., Lakeville, Ind.

[21] Appl. No.: 992,503

[22] Filed: Dec. 17, 1992

[51] Int. Cl.⁵ .............................................. B60C 5/22
[52] U.S. Cl. .................... 152/340.1; 152/518
[58] Field of Search ............ 152/518, 516, 340.1, 152/157, 158

[56] References Cited

U.S. PATENT DOCUMENTS

| | | | |
|---|---|---|---|
| 2,608,235 | 8/1952 | Wyman | 152/340.1 |
| 3,225,811 | 12/1965 | Hawkes | 152/340.1 |
| 3,476,168 | 11/1969 | Huber et al. | 152/340.1 X |
| 3,724,521 | 4/1973 | Coddington et al. | 152/340.1 |
| 4,995,438 | 2/1991 | Weber et al. | 152/518 |

Primary Examiner—Michael W. Ball
Assistant Examiner—Francis J. Lorin
Attorney, Agent, or Firm—Thomas J. Dodd

[57] ABSTRACT

A wheel and tire assembly which includes inner and outer tubeless tires mounted on the wheel. The two tires together define inner and outer air chambers which are pressurized through separate air valves. The outer tire includes a plurality of radially spaced projections on its inner surface which define passageway between the inner and outer tires at their respective beads to allow the filling of the outer chamber. The inner tire may include a bevelled end portion at its bead to further facilitate filling of the outer chamber.

3 Claims, 2 Drawing Sheets

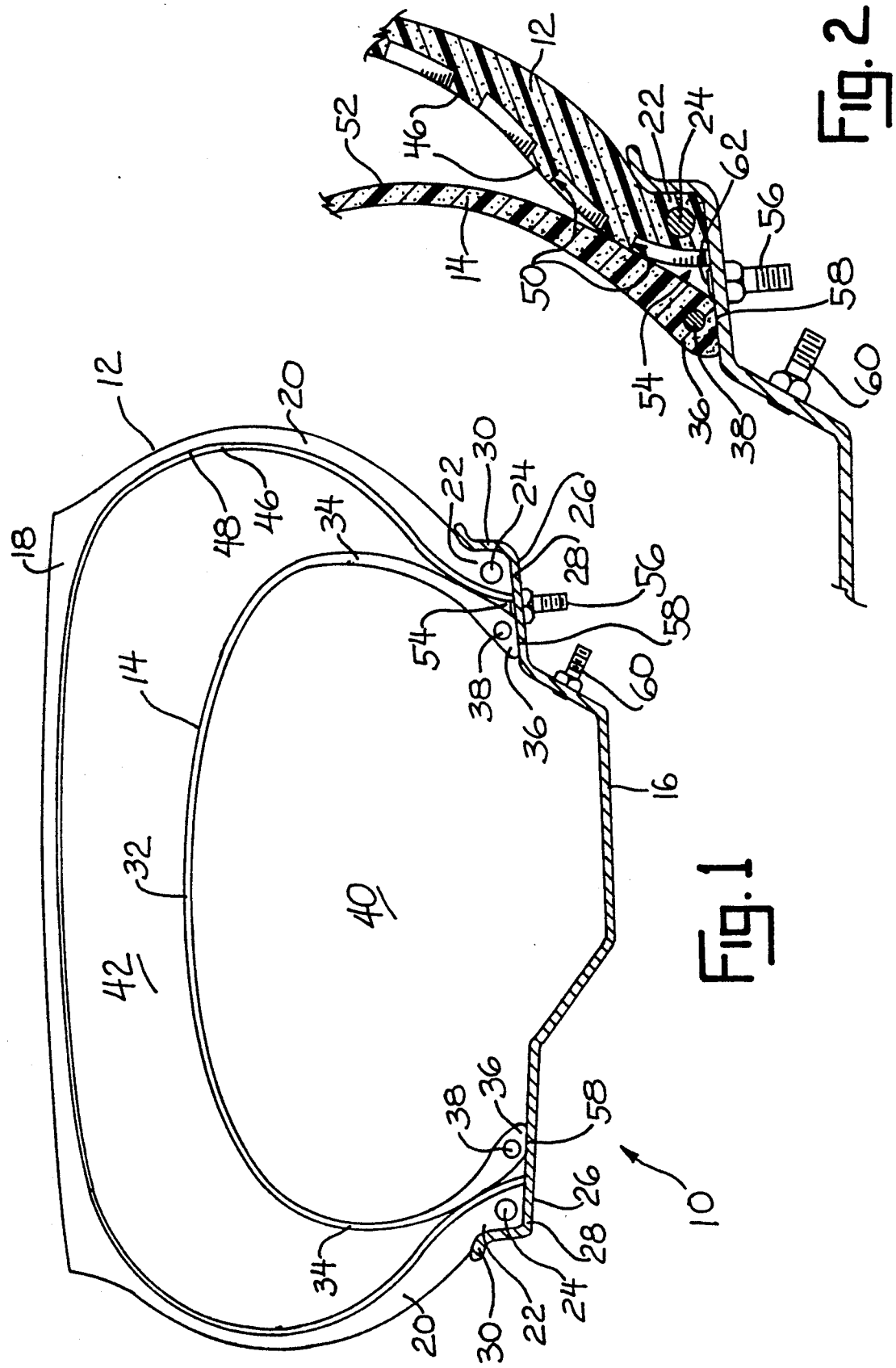

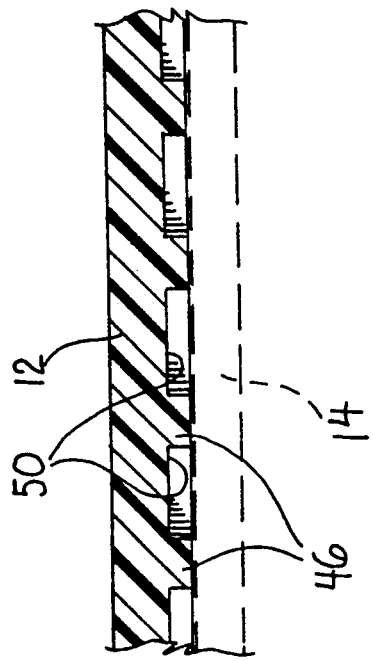
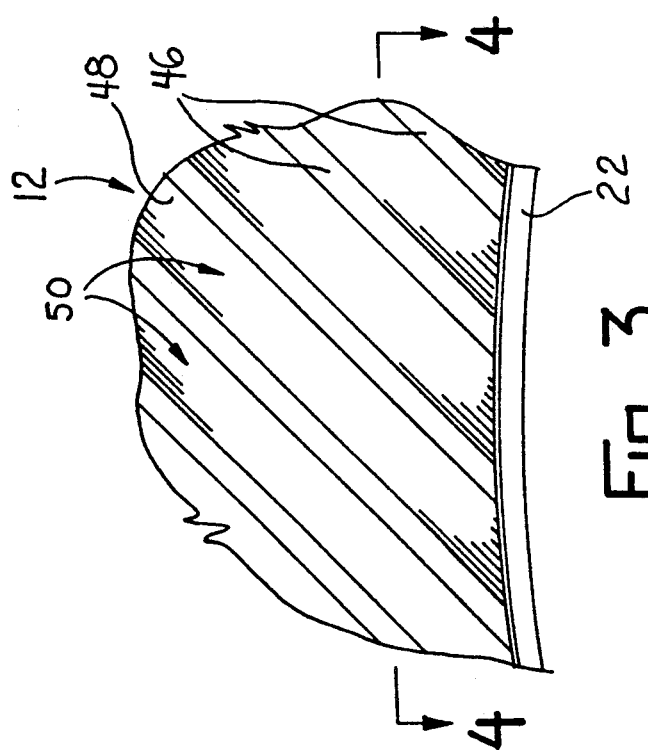

RACING TIRE ASSEMBLY

FIELD OF THE INVENTION

This invention relates to tires, and will have particular use in racing tires.

BACKGROUND OF THE INVENTION

Auto racing is one of the most exciting and dangerous sports in the world. Various auto racing rules making bodies have for years been enacting regulations in efforts to make their sport safer for drivers and fans. NASCAR, the governing body for the sport stock car racing, has for years required that cars be equipped with a dual tire assembly in order to enhance car stability in the event of sudden tire failure.

Until recently, this dual tire assembly consisted of a standard racing slick mounted to the outside of the wheel, and an inner tube liner which would serve to stabilize the car if the outer tire failed. Although this arrangement satisfied the safety requirements., improvements were needed.

Recently, Goodyear, developed a tire assembly which included inner and outer tubeless tires as described in detail in its U.S. Pat. No. 4,995,438. The Goodyear tire assembly includes projections formed on the outer surface of the inner tire to define air passages by which the outer chamber between the tires may be inflated. The main drawback to the Goodyear design is that the tire beads must be precisely positioned on the wheel so as not to block the air entry port. In many instances, the tire beads must be hand cut in the garage or in the pits to achieve proper spacing

SUMMARY OF THE INVENTION

This invention includes a dual tubeless tire assembly which requires no garage or pit adjustments to inflate. The outer tire is formed with internal surface projections at the bead area to provide the necessary air passages for filling the outer chamber. Since the inner surface of the outer tire normally has small ridges, little chance is needed in the tire mold. Also, outer tires formed in this manner weight less than their available counterparts.

The inner tire is preferably of a smooth outer surface and seats against the bead of the outer tire in a complementary manner. To aid in the alignment problem of prior art tires, the inner tire has a rim contacting portion which slopes away from the outer tire. This feature eliminates the need for cutting tires to open the airway to the outer chamber.

Accordingly, it is an object of this invention to provide for a novel and improved vehicle wheel and dual tire assembly.

Another object is to provide for a tire assembly which is lighter than prior art tires.

Another object is to provide a racing tire assembly which requires little or no modification once mounted.

Another object is to provide a racing tire assembly which is reliable, durable, safe and is economical to produce.

Other objects will become apparent upon a reading of the following description.

BRIEF DESCRIPTION OF THE DRAWINGS

FIG. 1 shows a cross section of the inventive tire and rim assembly.

FIG. 2 shows a close-up view of the inventive assembly at the bead portions of the tire showing the protrusions on the inner surface of the outer tire.

FIG. 3 shows a close-up of the protrusions on the inner surface of the outer tire as viewed directed towards the inner surface.

FIG. 4 is a cross-section of FIG. 3 along the line 4—4.

DESCRIPTION OF THE PREFERRED EMBODIMENT

The preferred embodiment herein described is not intended to be exhaustive nor to limit the invention to the precise forms disclosed. It is chosen and described to explain the principles of the invention and its application and practical use to enable others skilled in the art to utilize its teachings.

Referring to FIG. 1, reference number 10 generally designates the tire and wheel assembly of this invention. Assembly 10 includes generally an outer tubeless tire 12, inner tubeless tire 14 and wheel rim 16.

Outer tire 12 is the primary road contacting tire of assembly 10 and may be formed of rubber or composites in any conventional manner. Outer tire 12 as shown includes tread portion 18, sidewalls 20 and mounting beads 22 which preferably houses tensile member 24.

Wheel rim 16 includes a pair of diametrically opposed bead seating portions 26, defined by ledge 28 and radially outwardly extending flange 30. Outer tire 12 is mounted to rim 16 with its bead 22 contacting ledge 28 and flange 30 as shown.

Inner tire 14 is also preferably formed of rubber or composites in a conventional manner and includes crown portion 32, sidewalls 34 and beads 36 which house tensile member 38. Inner tire 34 is mounted on rim 16 with its beads 36 contacting ledge 28 to define an inner air chamber 40 and outer air chamber 42.

Outer tire 12 includes a plurality of radially spaced protrusions 46 integrally formed on its inner surface 48. Protrusions 46 define a plurality of air passageways 50 therebetween.

Inner tire 14 has a generally smooth outer surface 52 with beads 36 seated against protrusions 46 to define an air passageway 54 which allows for air flow communication between a fill valve 56, passageways 50 and outer air chamber 42. Beads 36 of inner tire 14 each have a terminal rim contacting portion 58 which slopes away from each outer tire bead 22 as shown to provide definition for passageway 54.

Rim 16 also includes a fill valve 60 which communicates directly with inner air chamber 40.

Assembly 10 is readied for use as follows. With the inner tire 14 and outer tire 12 mounted as described above, air is introduced into chamber 40 through valve 60 until the recommended pressure is reached. Air is then introduced through valve 56 and travels through passageways 54, 46 into outer air chamber 42 until the recommended pressure is reached. Due to sloped portion 58 enlarging passageway 54, no adjustments or alterations of outer tire 12 are needed when filling with air, even if one of the protrusions 46 is located directly in line with valve opening 62. It is recommended that the air pressure in inner chamber 42 exceed the air pressure in outer chamber 40 to prevent equalization and eventual collapse of inner tire 14 during use.

It is understood that the invention is not limited to the details above given, but may be modified within the scope of the following claims.

We claim:

1. A tire and rim assembly comprising a rim, said rim having a pair of diametrically opposed annular bead seating portions, each bead seating portion having a ledge and a radially outwardly extending flange, a tubeless pneumatic outer tire mounted on said rim, said outer tire having an inner surface defining an inner cavity when mounted, and a pair of axially opposed bead portions, each bead portion being disposed adjacent to said ledge and flange of one of said rim bead seating portions, a tubeless pneumatic inner tire disposed within said outer tire cavity mounted on said rim and dividing said cavity into an inner chamber and an outer chamber, said inner tire having first and second axially disposed bead portions disposed respectively adjacent to said outer tire bead portions, said outer tire inner surface having a plurality of spaced protrusions formed thereon and located adjacent said bead portions, said inner tire having a generally continuous smooth outer surface with said inner tire bead portions adjacently underlying said outer tire spaced projections to define an air passageway into said outer chamber, said rim including first valve means for allowing passage of air into said inner chamber, and second valve means for allowing passage of air through said passageway into said outer chamber.

2. The tire and rim assembly of claim 1 wherein each outer tire bead portion curves radially toward said inner tire bead portion, said inner tire bead portion having a radially curved portion conforming to the radial curve of said outer tire.

3. The tire and rim assembly of claim 2 wherein each inner tire bead portion has a terminal rim contacting portion sloping away from said outer tire bead portion.

* * * * *